(12) United States Patent
Okajima et al.

(10) Patent No.: US 8,613,022 B2
(45) Date of Patent: Dec. 17, 2013

(54) CONTENT PROVIDING APPARATUS, CONTENT PROVIDING METHOD, AND PROGRAM OF CONTENT PROVIDING METHOD

(75) Inventors: Hiroaki Okajima, Chiba (JP); Akira Shinada, Tokyo (JP); Katsuhiko Nunokawa, Kanagawa (JP); Makoto Sasaki, Chiba (JP)

(73) Assignee: Sony Corporation (JP)

( * ) Notice: Subject to any disclaimer, the term of this patent is extended or adjusted under 35 U.S.C. 154(b) by 1922 days.

(21) Appl. No.: 10/221,634

(22) PCT Filed: Jan. 28, 2002

(86) PCT No.: PCT/JP02/00583
§ 371 (c)(1),
(2), (4) Date: Feb. 10, 2003

(87) PCT Pub. No.: WO02/062059
PCT Pub. Date: Aug. 8, 2002

(65) Prior Publication Data
US 2003/0152247 A1    Aug. 14, 2003

(51) Int. Cl.
*G06F 13/00*  (2006.01)
*H04N 21/45*  (2011.01)
*H04N 21/442* (2011.01)

(52) U.S. Cl.
CPC ........ *H04N 21/4532* (2013.01); *H04N 21/4521* (2013.01); *H04N 21/44222* (2013.01)
USPC .......................................................... 725/46

(58) Field of Classification Search
USPC .......................................................... 725/46
See application file for complete search history.

(56) References Cited

U.S. PATENT DOCUMENTS

| 5,081,707 | A | * | 1/1992 | Schorman et al. ......... 455/186.1 |
| 5,945,988 | A |   | 8/1999 | Williams et al. |
| 6,064,385 | A |   | 5/2000 | Sturgeon et al. |
| 6,934,964 | B1 | * | 8/2005 | Schaffer et al. ................. 725/46 |
| 7,079,807 | B1 | * | 7/2006 | Daum et al. ................. 455/3.06 |
| 2006/0161952 | A1 | * | 7/2006 | Herz et al. ...................... 725/46 |

FOREIGN PATENT DOCUMENTS

| GB | 2 344 009 A | 5/2000 |
| JP | 4-351777 A | 12/1992 |
| JP | 6-311443 A | 11/1994 |
| JP | 8-180504 A1 | 7/1996 |
| JP | 9-017165 A | 1/1997 |
| JP | 11-134345 A | 5/1999 |
| JP | 11-195256 A | 7/1999 |
| JP | 11-196390 A | 7/1999 |
| JP | 2000-269840 A | 9/2000 |
| WO | 9965237 A1 | 12/1999 |

OTHER PUBLICATIONS

Communication from EP Application No. 02716403, dated Oct. 21, 2011.

* cited by examiner

*Primary Examiner* — Bennett Ingvoldstad
(74) *Attorney, Agent, or Firm* — Lerner, David, Littenberg, Krumholz & Mentlik, LLP

(57) ABSTRACT

Method and apparatus to determine a preference of a user based on a content of a broadcast selected by the user and a content of a recording medium, so that the content of the broadcast can be selectively recorded and provided.

16 Claims, 8 Drawing Sheets

FIG. 2 (A)

| PRIMARY ITEMS | MONTH (SEASON) |
| --- | --- |
| | DAY OF WEEK |
| | START TIME |
| | END TIME |
| | CHANNEL |
| | PRIMARY GENRE |

FIG. 2 (B)

SPECIFICS OF PRIMARY GENRES AND ACCOMPANYING SUB-ITEMS

| | SUB-ITEMS ACCOMPANYING EACH PRIMARY GENRE | | | | | |
| --- | --- | --- | --- | --- | --- | --- |
| DRAMA | JAPAN/ABROAD | TITLE | PLAYWRIGHT | CAST | | |
| MOVIE | DOMESTIC MOVIE/ FOREIGN MOVIE | GENRE | TITLE | DIRECTOR | PLAY-WRIGHT | CAST |
| SPORTS | GENRE | PLAYER | | | | |
| PLAY | | TITLE | PLAYWRIGHT | CAST | | |
| MUSIC | DOMESTIC MUSIC/ FOREIGN MUSIC | GENRE | TITLE | LYRICIST | COMPOSER | SINGER |
| VARIETY | CAST | | | | | |
| EDUCATION | GENRE | | | | | |
| ANIMATION | DUBBING ARTIST | | | | | |
| NEWS AND DOCUMENTARY | ANCHORPERSON | | | | | |
| HOBBY AND LIFE | GENRE | | | | | |
| OTHERS | | | | | | |

FIG. 3 (C)

| | |
|---|---|
| SPECIFICS OF MOVIE & PLAY GENRE | SF & FANTASY |
| | MUSICAL & MUSIC |
| | COMEDY |
| | WESTERN |
| | WAR |
| | MYSTERY & SUSPENSE |
| | HORROR |
| | LOVE & ROMANCE |
| | PERIOD DRAMA |
| | ACTION & ADVENTURE |
| | SEXUAL |
| | HUMAN DRAMA |
| | DOCUMENT AND LIVE |
| | YOUTH |
| | OTHERS |

FIG. 3 (D)

| | |
|---|---|
| SPECIFICS OF SPORTS GENRE | BASEBALL |
| | SOCCER |
| | GOLF |
| | TENNIS |
| | TRACK AND FIELD |
| | SWIMMING |
| | COMBAT SPORTS |
| | OTHERS |

FIG. 4 (E)

| SPECIFICS OF MUSIC GENRE | IDOL AND POPULAR SONG |
| --- | --- |
| | POPULAR BALLAD |
| | J-POP |
| | INDIES |
| | ROCK |
| | BLACK MUSIC |
| | CLUB MUSIC |
| | WORLD MUSIC |
| | JAZZ |
| | CLASSICAL MUSIC |
| | CONTEMPORARY MUSIC |
| | TRADITIONAL MUSIC |
| | SOUND TRACK |
| | NURSERY RHYME |
| | OTHERS |

FIG. 4 (F)

| SPECIFICS OF EDUCATION GENRE | CULTURE |
| --- | --- |
| | HISTORY |
| | PHILOSOPHY |
| | ECONOMY |
| | LANGUAGE |
| | OTHERS |

FIG. 4 (G)

| SPECIFICS OF HOBBY AND LIFE GENRE | COOKING |
| --- | --- |
| | GARDENING |
| | GAME OF GO & SHOGI |
| | ART |
| | OTHERS |

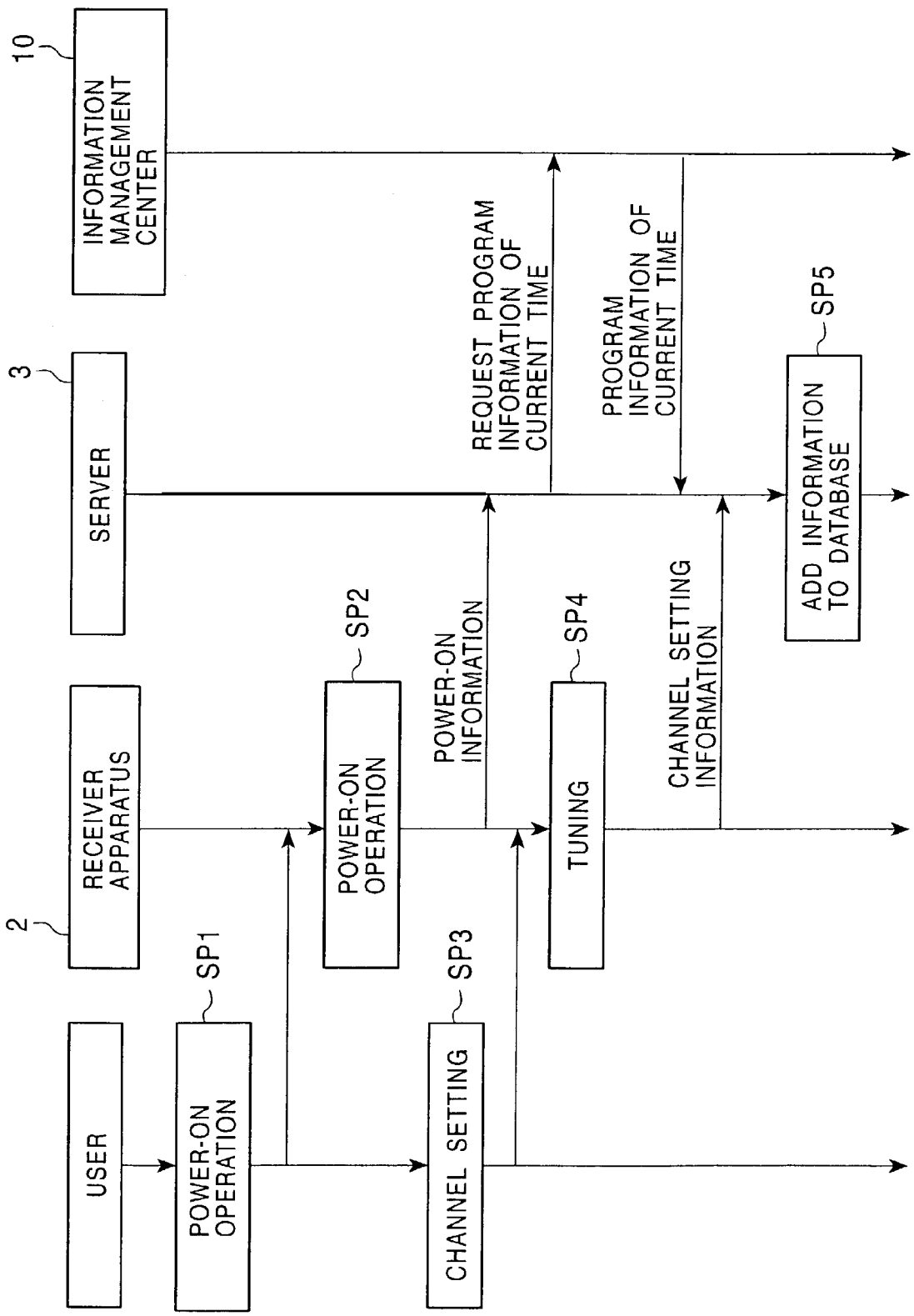

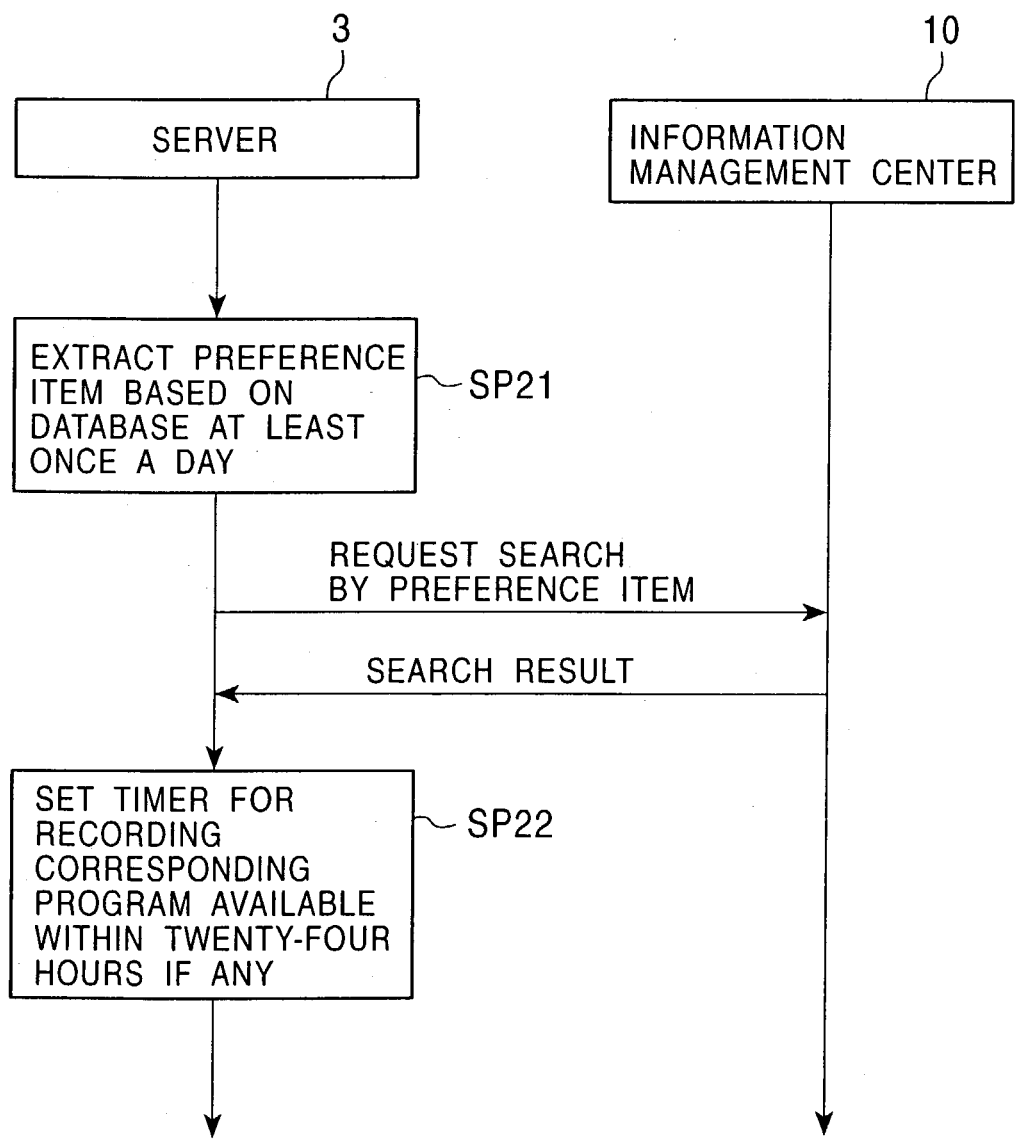

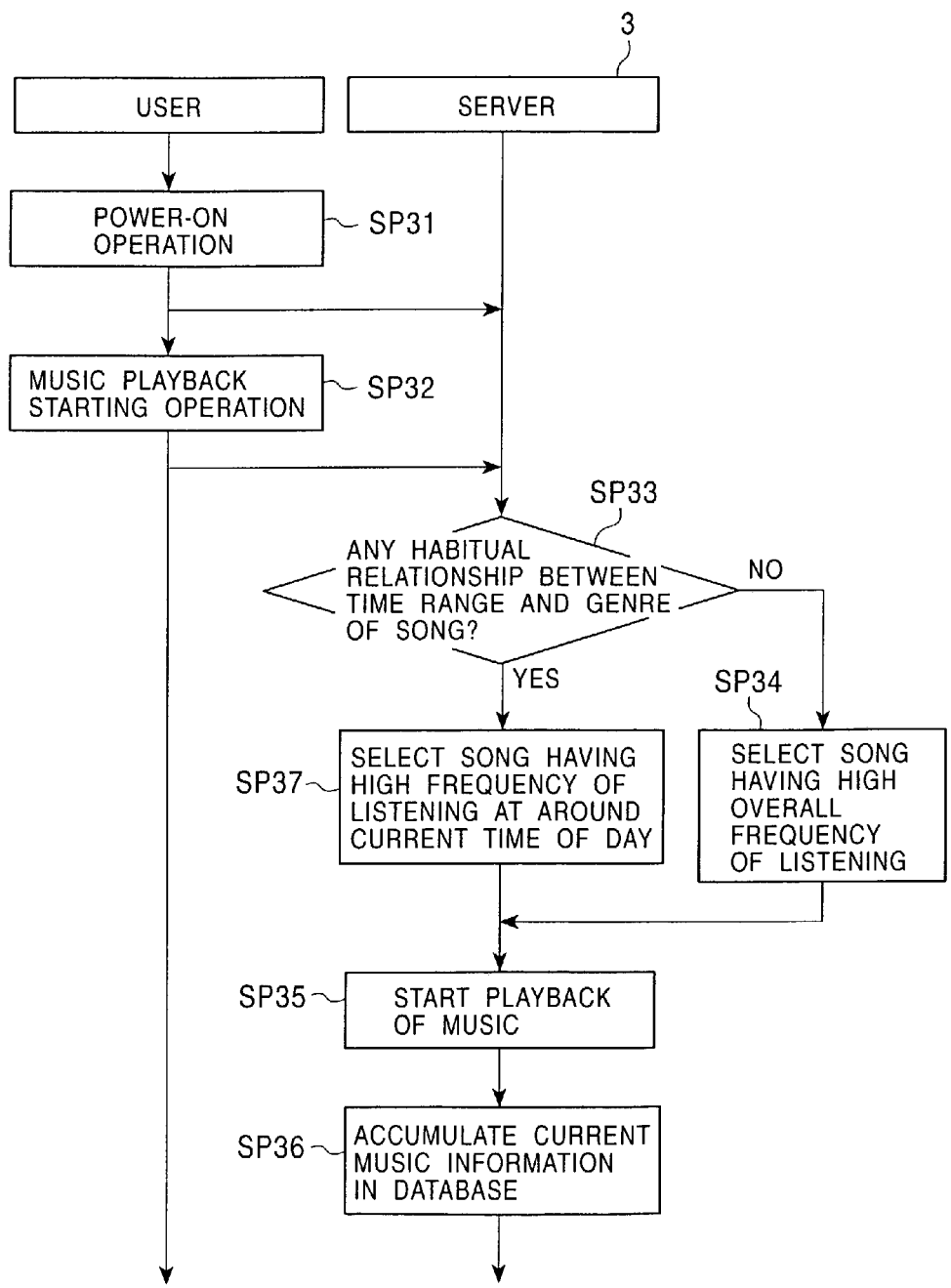

CONTENT PROVIDING APPARATUS, CONTENT PROVIDING METHOD, AND PROGRAM OF CONTENT PROVIDING METHOD

CROSS-REFERENCE TO RELATED APPLICATIONS

The present application is a national stage application under 35 U.S.C. §371 of International Application No. PCT/JP02/00583, filed Jan. 28, 2002, which claims priority from Japanese Application No. P2001-019323, filed Jan. 29, 2001, the disclosures of which are hereby incorporated by reference herein.

BACKGROUND OF THE INVENTION

1. Technical Field

The present invention is applied to various AV apparatuses of, for example, on-vehicle apparatuses and home networks, so that content desired by a user is provided from content of broadcast and content of a recording medium.

2. Background Art

Hitherto, AV apparatuses of the type that provides content distributed by broadcast to a user and of the type that plays back content from various recording media are in use.

Content distributed by broadcast includes television programs, FM broadcast programs, etc. With regard to such content, a desired program can be selected using a bill of fare on, for example, a newspaper, a weekly magazine, etc., and timer recording of the selected program is allowed. In digital broadcast, a bill of fare is provided by broadcast.

When a user is not allowed to view or listen to content thus provided at the time of broadcast, the user views or listens to the content by timer recording, i.e., by what is called time shifting. However, timer recording sometimes fails due to, for example, an incorrect operation. Furthermore, setting of timer recording itself is sometimes forgotten. Furthermore, it is possible that broadcast of a desired program itself passes unnoticed.

SUMMARY OF THE INVENTION

The present invention has been made in view of the above, and it proposes a content providing apparatus, a content providing method, and a program of a content providing method that serve to properly provide content of broadcast desired by a user.

To this end, the present invention is applied to a content providing apparatus, which comprises first content obtaining means for obtaining content of broadcast; second content obtaining means for obtaining content supplied via a predetermined recording medium; preference determination means for determining preference of a user based on a history of obtaining content by the first and second content obtaining means; content recording means for selectively obtaining content of broadcast by the first content obtaining means and recording the content obtained in a predetermined content recording medium, based on a result of determination by the preference determination means; and content playback means for selectively playing back and outputting the content recorded in the content recording medium.

By including first content obtaining means for obtaining content of broadcast; second content obtaining means for obtaining content supplied via a predetermined recording medium; preference determination means for determining preference of a user based on a history of obtaining content by the first and second content obtaining means; content recording means for selectively obtaining content of broadcast by the first content obtaining means and recording the content obtained in a predetermined content recording medium, based on a result of determination by the preference determination means; and content playback means for selectively playing back and outputting the content recorded in the content recording medium; content can be recorded in accordance with preference of the user as determined based not only on content provided by a broadcast but also on content provided via a recording medium such as a compact disc. Accordingly, content of broadcast desired by the user is properly provided.

Furthermore, the present invention is applied to a content providing method or a program of a content providing method, which comprises a preference determining step of determining preference of a user based on a history of obtaining content including content of broadcast and content of a recording medium; a content recording step of selectively recording the content of broadcast in a predetermined content recording medium based on a result of determination in the preference determining step; and a content playback step of selectively playing back and outputting the content recorded in the content recording medium.

According to this scheme, content can be recorded in accordance with preference of the user as determined based not only on content provided by a broadcast but also on content provided via a recording medium such as a compact disc. Accordingly, content of broadcast desired by the user is properly provided.

BRIEF DESCRIPTION OF THE DRAWINGS

FIG. 2(A) and FIG. 2(B) are diagrams showing history data of the AV system shown in FIG. 1.

FIGS. 3(C) and (D) are diagrams showing subsequent parts of the history data shown in FIG. 2.

FIGS. 4(E), (F), and (G) are diagram showing subsequent parts of the history data shown in FIG. 2.

FIG. 5 is a time chart showing recording of history data associated with content of broadcast.

FIG. 7 is a time chart showing a processing procedure of a central processing unit in the AV system shown in FIG. 1.

FIG. 8 is a time chart for explaining playback of content in accordance with preference of a user.

DETAILED DESCRIPTION

Best Mode for Carrying Out the Invention

A preferred embodiment of the present invention will now be described with reference to the drawings as needed.

(1) Construction of the Embodiment

Figure 1:
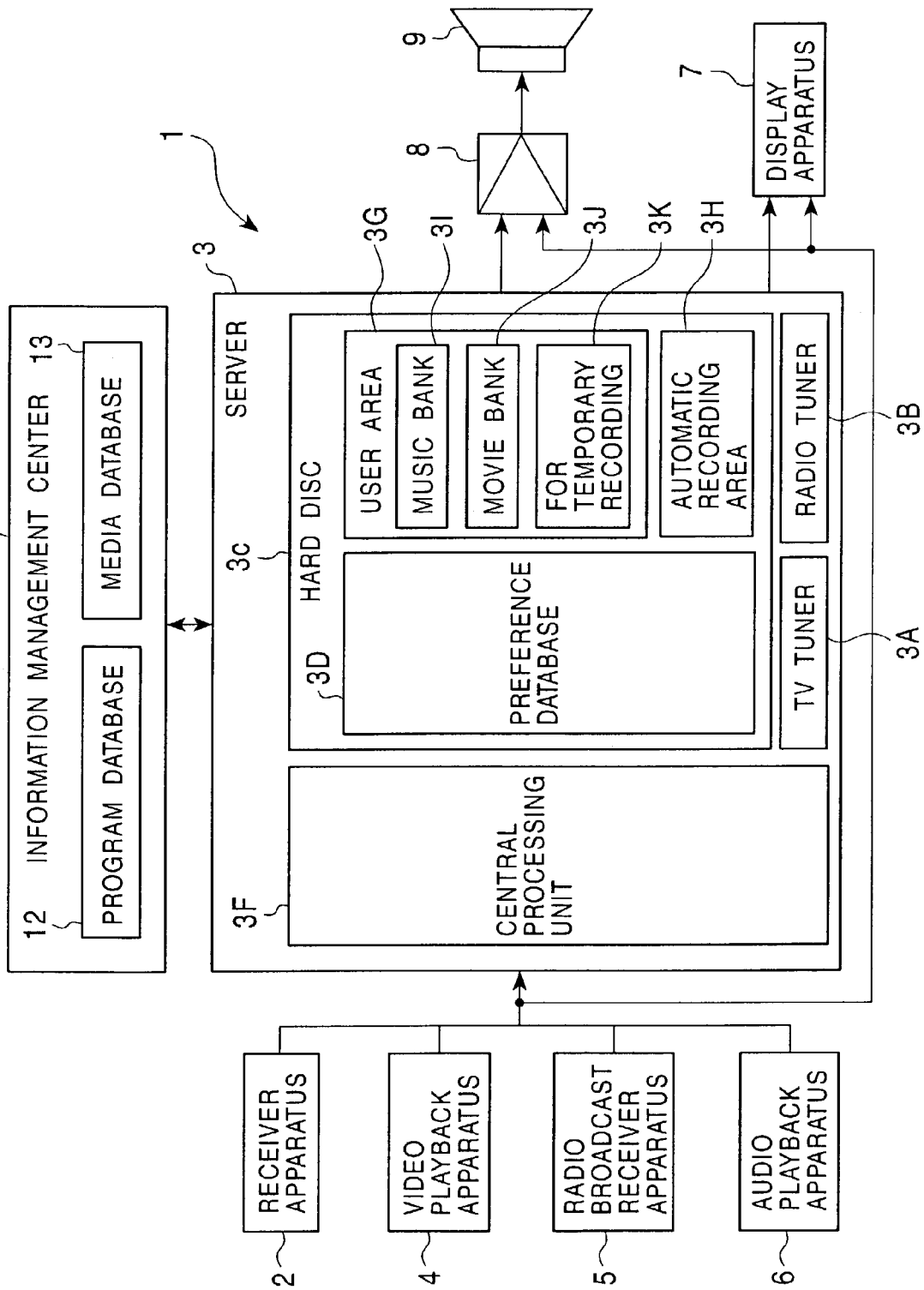
FIG. 1 is a block diagram showing an AV system according to an embodiment of the present invention.

FIG. 1 is a block diagram showing an AV system according to an embodiment of the present invention. In the AV system 1, a receiver apparatus 2 receive conventional terrestrial television broadcast, digital television broadcast, broadcasting satellite (BS) television broadcast, and communication satellite (CS) television broadcast, and it outputs video signals and audio signals obtained by receiving these television broadcasts according to user operations or control by a server 3.

Furthermore, when such content is received, the receiver apparatus 2 outputs information regarding a channel being received, time, etc. to the server 3 so that the server 3 is allowed to identify the content being received.

A video playback apparatus 4 plays back and outputs, according to a user operation, a video signal and an audio signal from an optical disk (DVD: Digital Video Disc) or a video tape serving as a recording medium. At this time, in relation to the video signal and the audio signal for playback, the video playback apparatus 4 plays back information regarding content recorded in TOC in the case of an optical disk and outputs the information to the server 3. In the case of a video tape, the video playback apparatus 4 plays back information regarding content recorded in a vertical blanking period, etc. and outputs the information to the server 3. The information regarding content serves to identify the content. Accordingly, the video playback apparatus 4 allows the server 3 to identify content being viewed by a user even if the content is provided via a recording medium.

A radio broadcast receiver apparatus 5 receives and outputs a program of an FM (Frequency Modulation) broadcast or a program of an AM (Amplitude Modulation) broadcast according to a user operation. At this time, the radio broadcast receiver apparatus 5 also obtains information regarding content from a broadcast wave and outputs the information to the server 3. Accordingly, also in this case, the radio broadcast receiver apparatus 5 allows the server 3 to identify content being listened to by a user.

An audio playback apparatus 6 plays back and outputs, according to a user operation, an audio signal recorded on an optical disk (CD: Compact Disc), a mini disc (MD: Mini Disc), or a magnetic tape serving as a recording medium. At this time, the audio playback apparatus 6 plays back data such as TOC (Table Of Contents) to output information regarding content. Accordingly, the audio playback apparatus 6 allows the server 3 to identify content being listened to by a user.

Accordingly, the receiver apparatus 2 and the radio broadcast receiver apparatus 5, together with a television tuner 3A and a radio tuner 3B to be described later, constitute first content obtaining means for respectively obtaining content of broadcast, whereas the video playback apparatus 4 and the audio playback apparatus 6 constitute second content obtaining means for obtaining content supplied via a predetermined recording medium.

A display apparatus 7 displays a video signal output from the receiver apparatus 2 or the video playback apparatus 4, or a video signal output from the server 3. An amplifier 8 amplifies an audio signal output from the receiver apparatus 2, the video playback apparatus 4, the radio broadcast receiver apparatus 5, or the audio playback apparatus 6, or an audio signal output from the server 3, outputting the result via a speaker 9. Accordingly, the AV system 1 allows viewing and listening to video and audio content of broadcast and of a recording medium.

An information management center 10 allows access by the server 3 via a network such as the Internet, and stores, at least, program data of each broadcast that can be received by the receiver apparatus 2 or the radio broadcast receiver apparatus 5 in the form of a bill of fare in a program database 12. Furthermore, the information management center 10 stores, at least, content data of a recording medium that can be played back by the video playback apparatus 4 or the audio playback apparatus 6 in a media database 13.

The program data and content data each represent a profile of content, and can be identified on the basis of data regarding content, obtained by the video playback apparatus 4, etc. and with regard to content received by the receiver apparatus 2, can be identified by a receiving channel, a receiving time, etc. The program data relates to programs currently being broadcast, programs to be subsequently broadcast, and programs that have been broadcast in the past, and is stored in the program database 12. The program data includes a time of broadcast, a day of week of broadcast, a channel, a program genre, main cast, etc., which correspond to history data to be described later. If content is associated with music program of a radio broadcast, the program data includes a music title, a song title, a lyricist, a composer, an artist, and manufacturer data in relation to music broadcast in the program, in addition to a time of broadcast, a day of week of broadcast, a channel, a program genre, and main cast of the program.

The content data includes similar items corresponding to history data, a title set for a recording medium having content recorded thereon, and with regard to video content, main cast, a director, etc., and with regard to music content, a music title, a song title, a lyricist, a composer, an artist, and manufacturer data. Accordingly, in the AV system 1, information needed for determining preference of a user with regard to content received by the receiver apparatus 2, etc. or content played back by the video playback apparatus 4 can be obtained by accessing the information management center 10.

The server 3 determines preference of a user by accumulating the program data and content data thus obtained, and automatically records programs in accordance with preference of the user based on the result of the determination, providing the programs to the user. More specifically, the server 3 includes a television tuner (TV tuner) 3A corresponding to the receiver apparatus 2 and a radio tuner 3B corresponding to the radio broadcast receiver apparatus 5, so that desired content can be received.

Furthermore, the server 3 includes a hard disc apparatus 3C having a large capacity, and creates a preference database 3D in the hard disc apparatus 3C. The preference database 3D is created by recording history data of obtaining content viewed or listened to by a user based on selection by the user.

In the case of video content, the history data includes a month (or season), a day of week, a start time of broadcast, and an end time of broadcast that identify a time of broadcast, and in addition, a channel of broadcast and a program genre, as shown in FIG. 2(A). If content is not associated with broadcast (i.e., in the case of content supplied via a recording medium), data identifying the audio playback apparatus 6 or the video playback apparatus 4 is assigned to the channel of broadcast, and a time of playback is recorded in the items identifying a time of broadcast.

The program genre is classified into specific types of content such as drama, movie, and sports, as shown in FIG. 2(B), and specific sub-items are set for each of the items. More specifically, in the case of drama content, distinction as to domestic/foreign drama, a title, a playwright, and main cast are recorded. In the case of movie content, distinction as to domestic/foreign movie, a specific genre, a title, a director, a playwright, and main cast are recorded. Specific genres of movie include SF & fantasy, musical and music, comedy, Western, etc., as shown in FIG. 3(C).

In the case of sports content, a specific genre and players are recorded. Specific genres of sports include baseball, soccer, golf, tennis, etc, as shown in FIG. 3(D). In the case of play content, a specific genre, a title, a playwright, and main cast are recorded, similarly to movie. In the case of music content, distinction as to domestic/foreign music, a specific genre, a song title, a lyricist, a composer, and a singer are recorded. Specific genres of music include idol and popular song, popular ballad, J-POP, etc., as shown in FIG. 4(E)

In the case of a variety program, main cast is recorded. In the case of an education program, a specific genre, classified as culture, history, philosophy, or economy, as shown in FIG. 4(F), is recorded. In the case of animation, a dubbing artist is recorded. In the case of news or documentary content, an anchorperson is recorded. If content relates to hobby and life, a specific genre, classified as cooking, gardening, etc., as shown in FIG. 4(G), is recorded.

In the case of music content obtained by the radio broadcast receiver apparatus 5, the audio playback apparatus 6, or the radio tuner 3B, the same primary genres as in the case of music described above are set. History data is created, by executing a predetermined processing procedure by the central processing unit 3F, for each content viewed or listened to based on selection of a user, with items set to values in accordance with program data and content data obtained by accessing the information management center 10, and is then recorded in the preference database 3D.

FIG. 5 is a time chart showing a processing procedure for creating the preference database 3D. In the processing procedure, when the user operates a power supply of the receiver apparatus 2 in step SP1, the receiver apparatus 2 is powered on in subsequent step SP2, and the server 3 is notified of the power-on. In the server 3, upon the notification of power-up, the information management center 10 is accessed under the control of the central processing unit 3F, obtaining program data that can be received by the receiver apparatus 2 at the current time.

Around the time of the process of obtaining program data, when the user selects a channel in step SP3, the receiver apparatus 2 executes a tuning process in subsequent step SP4 in response to the channel selection operation, so that reception of the channel selected by the user is started. The receiver apparatus 2 notifies the server 3 of information of the channel whose reception has been started. In the server 3, program data of the corresponding channel is selected from the receivable program data that has been received from the information management center 10 under the control of the central processing unit 3F, and history data is set by the selected program data and is recorded in the preference database 3D. If the user thus starts viewing the content and then continues enjoying content by the receiver apparatus 2 even after the program has ended, the central processing unit 3F accesses the information management center 10 again with reference to an end time obtained from the program data to obtain program data that can be viewed in a subsequent time range, and creates history data of the program being enjoyed by the user using the program data thus obtained, recording the history data in the preference database 3D.

Similarly, when the user selects content by the television tuner 3A or the radio broadcast receiver apparatus 5, the central processing unit 3F also creates history data for each program, recording the history data in the preference database 3D.

Figure 6:
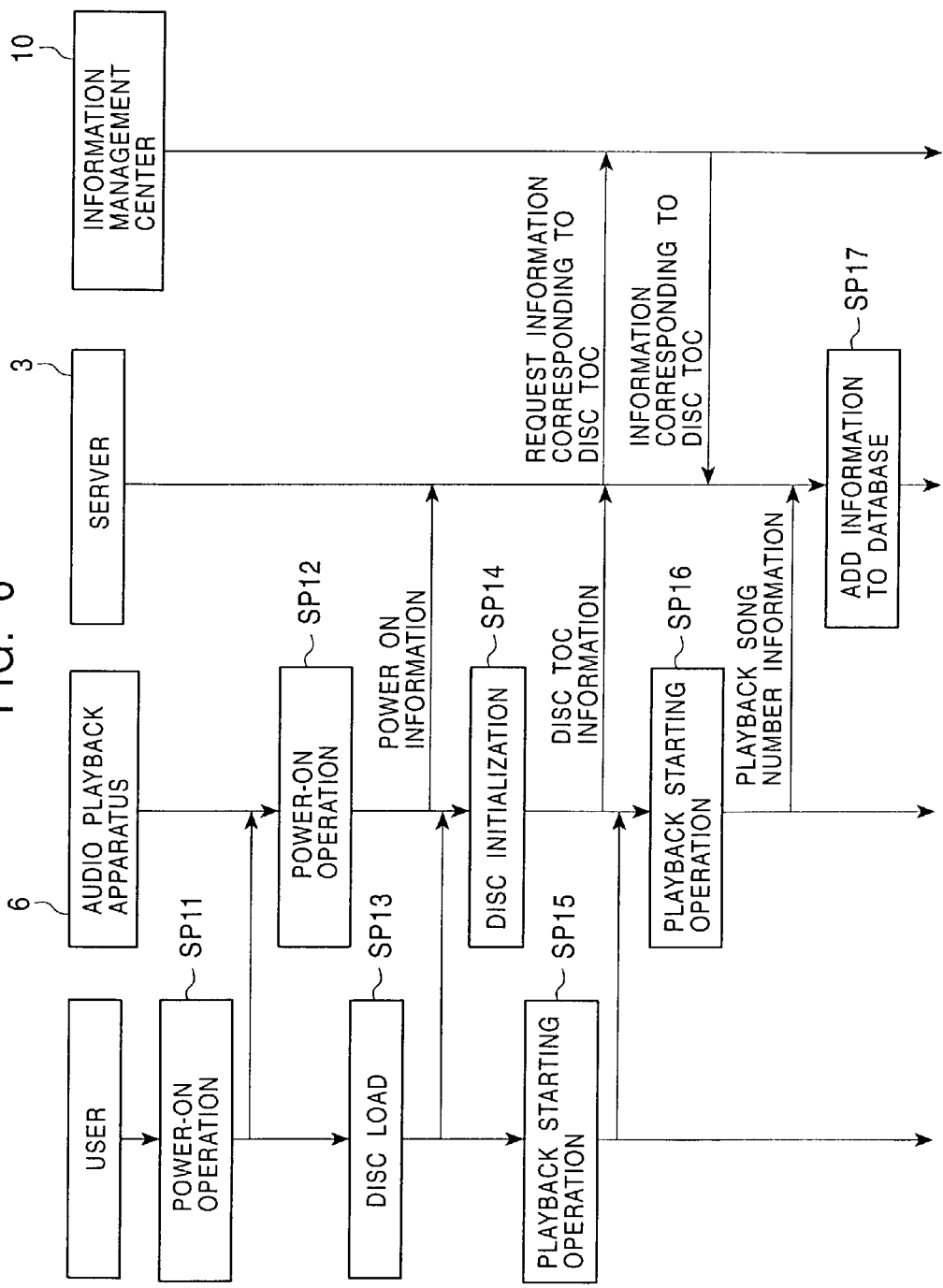
FIG. 6 is a time chart showing recording of history data associated with content of a recording medium.

FIG. 6 is a time chart showing a processing procedure in relation to the preference database 3D, which is executed when the audio playback apparatus 6 serving as a playback apparatus of a recording medium is operated by the user. In the processing procedure, when the user operates a power supply of the audio playback apparatus 6 in step SP11, the audio playback apparatus 6 is powered on in subsequent step SP12, and the server 3 is notified of the power-on.

When the user sets an optical disc and operates a predetermined operation unit in subsequent step SP13, the audio playback apparatus 6 loads the optical disc in subsequent step SP14 and plays back a lead-in area to obtain TOC data. The audio playback apparatus 6 notifies the server 3 of the TOC data. Upon the notification, the server 3 accesses the information management center 10 under the control of the central processing unit 3F, obtaining corresponding content data.

Around the time of the process of obtaining content data, when the user instructs playback of the optical disc in step SP15, the audio playback apparatus 6 starts playback of a corresponding song in step SP16. Furthermore, history data of songs associated with the playback is sequentially created in step SP17 from content data obtained from the information management center 10, recording the history data in the preference database 3D.

In this case, the central processing unit 3F creates history data for each song and registers the history data in the preference database 3D. Similarly, for example, when the video playback apparatus 4 is operated by the user to play back a DVD, the central processing unit 3F also accesses the information management center 10 to obtain content data, and creates history data from the content data, registering the history data in the preference database 3D.

Accordingly, in the server 3, a profile etc. of content enjoyed by the user by his/her own selection is recorded in a database, which serves to determine preference of the user. Furthermore, content of broadcast and content of a recording medium are managed by the same preference database 3D, so that preference of the user regarding the content can be processed in an integrated manner.

The hard disc apparatus 3C includes a user area 3G and an automatic recording area 3H as well as an area of the preference database 3D. The user area 3G is managed as a bank structure, which includes a music bank 3I, a movie bank 3J, and a temporary recording bank 3K.

The music bank 3I is an area that stores content played back by the audio playback apparatus 6 and content received by the radio broadcast receiver apparatus 5 or the radio tuner 3B so that the content can be used as a jukebox. The movie bank 3J is an area that stores content played back by the video playback apparatus 4 and content received by the receiver apparatus 2 or the television tuner 3A so that the content can be reused. The temporary recording bank 3K is an area that stores content selected by the user from content of broadcast automatically recorded by the server 3 in accordance with preference of the user. The automatic recording area 3H is an area for storing content of broadcast automatically recorded by the server 3 in accordance with preference of the user as mentioned above. The server 3 allows management of content desired by the user among content recorded in the automatic recording area 3H to be transferred to the temporary recording bank 3K.

FIG. 7 is a time chart showing a processing procedure of automatic recording executed by the central processing unit 3F using the automatic recording area 3H. The central processing unit 3F executes the processing procedure when the user operates a predetermined operation unit to set operation mode of the server 3 to an automatic recording mode.

That is, in the server 3, the central processing unit 3F accesses the preference database 3D in step SP21 at a predetermined time, and statistically processes history data, thereby determining preference of the user. More specifically, the central processing unit 3F selects a program, an artist, etc. that have been frequently viewed or listened to by the user from the history data recorded in the preference database 3D, thereby determining preference of the user.

The central processing unit 3F requests a search over the program database 12 to the information management center 10 using as a key the favorite genre, artist, etc. of the user obtained by the determination, and receives notification of program data of programs presumably in accordance with preference of the user.

If a program within twenty-four hours presumably desired by the user is included in the notification, timer recording is set to the television tuner 3A or the radio tuner 3B, and the processing procedure is then exited.

Accordingly, when a start time of recording has come, the central processing unit 3F powers on the television tuner 3A or the radio tuner 3B, and records a program associated with the received program data of the notification in the automatic recording area 3H. If remaining capacity of the automatic recording area 3H is lacking at this time, the central processing unit 3F controls operation of the hard disc apparatus 3C so as to overwrite and delete content recorded earliest in the past, thereby recording content obtained by the television tuner 3A or the radio tuner 3B.

If the user operates a predetermined operation unit to instruct display of a list of content that has thus been automatically recorded, the central processing unit 3F displays a list of content stored in the automatic recording area 3H. Furthermore, if the user specifies content in the displayed list and instructs deletion thereof, record of the content is deleted from the hard disc apparatus 3C. If the user instructs saving, management of the content is transferred from the automatic recording area 3H to the temporary recording bank 3K. If the user specifies content in the displayed list and instructs playback thereof, overall operation is controlled so that the content is played back and a corresponding video signal and/or audio signal are output to the display apparatus 7 and/or the amplifier 8. Accordingly, the central processing unit 3F records a title of content, etc. together with content recorded in the automatic recording area 3H so that the user is allowed to recognize the content.

Since content whose management has been transferred by the user to the temporary recording bank 3K and content that has been viewed or listened to almost entirely in response to a user instruction for playback can be assumed as content in accordance with preference of the user, the central processing unit 3F creates history data for such content and records the history data in the preference database 3D, similarly to content obtained based on selection by the user.

When the user instructs automatic playback of an audio signal, the central processing unit 3F executes a processing procedure shown in FIG. 8, selecting content recorded in the music bank 3I based on a current condition and playing back the selected content. More specifically, in the AV system 1, when the user activates power in step SP31 and then instructs automatic playback of music in subsequent step SP32, the central processing unit 3F accesses the preference database 3D with reference to the current time in subsequent step SP33. By the access, the central processing unit 3F determines whether a habitual relationship exists in content of audio signals that have been listened to by the user in the past at the current time of day. For example, if the frequency of listening to classical music is high at the time range of the access although the frequency of listening to pops is high in other time ranges, it is determined that the user has a habit of listening to classical music in the time range of the access.

The central processing unit 3F determines such habit of the user based on tendency of history data recorded in the preference database 3D. If the central processing unit 3F determines that no habitual relationship exists, the central processing unit 3F accesses the preference database 3D again in step SP3, detecting a favorite genre or title of the user and selecting content of an audio signal recorded in the music bank 3I based on the genre or title.

Furthermore, in subsequent step SP35, playback of the selected content is instructed, and playback of the content is recorded in the preference database 3D in step SP36, and the processing procedure is then exited. The recording in the preference database 3D in step SP36 is executed when the user does not execute an operation such as re-selecting a song with regard to the content provided.

If it is determined that a habitual relationship exits, the central processing unit 3F proceeds from step SP33 to step SP37, in which the central processing unit 3F detects a genre or title having the highest frequency of listening in the current time range. Furthermore, the central processing unit 3F selects content of the detected genre or title from content of audio signals recorded in the music bank 3I, then proceeding to step SP35.

As a presupposition of these processes, when downloading of content is instructed by a user operation, the central processing unit 3F records video content output from the receiver apparatus 2, the video playback apparatus 4, or the television tuner 3A in the movie bank 3J, while recording music content output from the radio broadcast receiver apparatus 5, the audio playback apparatus 6, or the radio tuner 3B in the music bank 3I.

Furthermore, the central processing unit 3F displays a list of various content thus recorded in the movie bank 3J and the music bank 3I according to user operations, accepting selection by the user, and selectively plays back content desired by the user from the various content recorded in the movie bank 3J and the music bank 3I.

(2) Operation of the Embodiment

According to the scheme described above, in the AV system 1 (FIG. 1), when a user wishes to receive a television broadcast, a desired channel is selected by the receiver apparatus 2 or the television tuner 3A according to a user operation, whereby a video signal and an audio signal broadcast by the channel are output from the display apparatus 7 and the speaker 9, respectively, so that desired video content of broadcast can be enjoyed.

If the user wishes to view a movie or the like provided via a recording medium such as a DVD or a video tape, a video signal and an audio signal are played back from the recording medium according to an operation of the video playback apparatus 4, whereby the video signal and the audio signal are output from the display apparatus 7 and the speaker 9, respectively, so that desired video content from the recording medium can be enjoyed.

Furthermore, if the user instructs recording when video content is received or played back as described above, and furthermore, if the user instructs downloading of video content of broadcast or a recording medium, video content received by the receiver apparatus 2 or the television tuner 3A or video content played back by the video playback apparatus 4 is recorded in the movie bank 3J of the server 3. Accordingly, in the AV system 1, video content is accumulated and stored in the server 3, so that the user is allowed to enjoy the content at anytime desired.

If the user wishes to receive a radio broadcast, a broadcast wave desired by the user is received by the radio broadcast receiver apparatus 5 or the radio tuner 3B according to a user operation, and an audio signal thus received is provided to the user via the speaker 9. Accordingly, in the AV system 1, content of broadcast, such as music, can be enjoyed.

If the user wishes content, such as music, provided via a recording medium such as a compact disc, an audio signal recorded on the recording medium is played back by the audio playback apparatus 6 according to a user operation, whereby the audio signal is provided to the user via the speaker 9. Accordingly, in the AV system 1, content of a recording medium, such as music, can be enjoyed.

Furthermore, if the user instructs recording when content such as music is received or played back as described above, and furthermore, if the user instructs downloading of content of broadcast or a recording medium, such as music, content of an audio signal received by the radio broadcast receiver apparatus 5 or the radio tuner 3B or content of an audio signal played back by the audio playback apparatus 6 is recorded in the music bank 3I of the server 3. Accordingly, in the AV system 1, content such as music can be accumulated and stored in the server 3, so that the user is allowed enjoy the content at anytime desired.

When content such as video and music, supplied by broadcast or via a recording medium, is provided to the user according to a user operation, the server 3 accesses the program database 12 and the media database 13 at the information management center 10 to load, for each content, program data including a program genre, main cast, etc. and content data including a title of recording medium, a title of recorded content, etc., and thereby creates history data representing content that has been viewed or listened to by the user, recording the history data in the preference database 3D.

If the user frequently views or listens to programs or music of the same genre or title, a large number of records of the same genre or title is included in the history data accumulated in the preference database 3D as described above. Thus, preference of the user can be determined based on tendency of the history data accumulated in the preference database 3D.

Accordingly, in the AV system 1, when the user instructs automatic recording of program, a favorite genre, title, artist, etc. of the user are detected from the records in the preference database 3D, and the program database 12 is accessed using these items as keys, thereby detecting programs to be broadcast within twenty-four hours and presumably in accordance with preference of the user. Furthermore, by the detection, corresponding program data is loaded, setting timer recording is set using a start time of broadcast, an end time of broadcast, and a channel that are set in the program data. When the setting has been made and the start time of broadcast has come, the television tuner 3A or the radio tuner 3B is powered on, and the program detected as being presumably in accordance with preference of the user is recorded in the automatic recording area 3H. Furthermore, if the user instructs display of a list of programs that have been automatically recorded, a list of programs that have been recorded in the automatic recording area 3H is displayed, and the programs are selectively provided via the display apparatus 7 and the speaker 9 according to an instruction by the user. Furthermore, management of the content thus provided to the user is transferred to the temporary recording bank 3K from the automatic recording area 3H.

Accordingly, in the AV system 1, programs that have not been missed by the user, such as a serial drama, programs featuring a favorite actor, etc. of the user are provided to the user without fail.

In particular, in the AV system 1, preference of the user is determined with history of viewing or listening to content provided via a recording medium such as a compact disc taken into consideration. Accordingly, for example, when a favorite artist whose albums have not been missed for purchase is featured on a radio broadcast program or a television broadcast program, and furthermore, when a promotion video of a new song of the artist is broadcast, these programs are provided to the user without fail, serving to improve usability.

Accordingly, in the AV system 1, content whose management has transferred to the temporary recording bank 3K as described above can also be recorded in the music bank 3I or the movie bank 3J, so that the user is allowed to enjoy the content at anytime desired.

When the user instructs automatic playback of an audio signal, the AV system 1 determines whether a habitual relationship exists in the viewing/listening history of the user by accessing the preference database 3D. If it is determined that no habitual relationship exists, the AV system 1 plays back music content of a favorite genre or title of the user from the music bank 3I, which is provided via the speaker 9. Accordingly, in the AV system 1, music in accordance with preference of the user is provided even if playback of music content that has been recorded and stored depends on selection by the apparatus.

If it is determined that a habitual relationship exists, the AV system 1 detects music of a genre or title having the highest frequency of listening at the current time of day. Furthermore, an audio signal of the genre or title thus detected is played back from the music bank 3I and is provided to the user. Accordingly, in the AV system 1, for example, if a person has a habit of listening to classical music in the morning, pops in the afternoon, and jazz in the evening, music of the genres the user habitually listens to in the morning, in the afternoon, and in the evening, respectively, is selected and provided. As another example, if a person has a habit of listening to a hit chart, a song that has recently been listened to frequently or a song that has been recorded most recently is provided. Without limitation to selection of a song on the basis of genre, for example, if a particular music is played in the evening, the music is provided to the user.

(3) Advantages of the Embodiment

According to the scheme described above, content of broadcast is selectively recorded in accordance with preference of a user as determined based on content of broadcast selected by the user and content of a recording medium, so that content of broadcast desired by the user is properly provided.

Furthermore, data of content obtained by the user is sequentially recorded to create history of obtaining content. Accordingly, preference of the user under various conditions, for example, preference of the user in relation to time ranges such as morning, afternoon, and evening, can be determined, so that content desired by the user is properly provided to the user.

That is, content recorded in a hard disc apparatus serving as predetermined content obtaining means is selectively played back and output based on a result of determination as to preference, and furthermore, content that is determined as being in accordance with preference of the user under a current condition is selectively output, so that content desired by the user is properly provided to the user.

(4) Other Embodiments

Although the above embodiment has been described in relation to a case where history is recorded as to content of broadcast and of a recording medium and preference of a user is determined accordingly, the present invention is not limited thereto, and for example, selective playback by the user of content accumulated, for example, in a hard disc apparatus may also be used as a basis for determining preference.

Furthermore, although the above embodiment has been described in relation to a case where history of obtaining content is recorded by accessing a management center and time recording is set, the present invention is not limited thereto, and for example, these processes may be executed using an electronic bill of fare.

Furthermore, although the embodiment has been described in relation to a case where broadcast programs are selectively recorded in accordance with preference of the user and music content recorded in a music bank is provided to the user, the present invention is not limited thereto, and for example, instead of or in addition to providing music content recorded in the music bank, preference of the user may be utilized in providing broadcast programs. In that case, for example, if the user has a habit of switching channels in the morning and viewing stock market, general news, etc., programs in accordance with the habit are provided to the user.

Furthermore, although the embodiment has been described in relation to a case where preference of the user is determined based on history of obtaining content with reference to the current time of day and music is provided accordingly, the present invention is not limited thereto, and may be applied to an on-vehicle audio apparatus so that music is provided in accordance with preference of the user as determined according to conditions such as traveling speed, and may be used in combination with a car navigation system so that music is provided in accordance with preference of the user as determined according to conditions of a current position of travel. Accordingly, for example, music suitable for beach is selected when traveling along a seacoast, "From the New World" by Dvorak is selected when traveling in the mountains at dusk, and a fast-paced song is selected when traveling on a highway.

As described above, according to the present invention, content of broadcast is selectively recorded in accordance with preference of a user as determined based on content of broadcast selected by the user and content of a recording medium, so that content of broadcast desired by the user is properly provided.

FIELDS OF INDUSTRIAL APPLICATION

Relates to a content providing apparatus, a content providing method, and a program of a content providing method, and is applicable, for example, to AV apparatuses of, for example, on-vehicle apparatuses and home networks.

The invention claimed is:
1. A content providing apparatus, comprising:
a processing unit for:
obtaining a plurality of programs of broadcast content, the programs of broadcast content each including at least one of an audio signal or a video signal;
obtaining a plurality of programs of stored content supplied from a predetermined recording medium, the programs of stored content each including at least one of audio data or video data;
automatically determining a preference of a user based on user selection for saving from among the programs of stored content and based on a user history of obtaining the programs of broadcast content and the programs of stored content by said processing unit, the user history including time of day of the obtaining of each program of broadcast content and time of day of the obtaining of each program of stored content so that the user preference varies as a function of time of day;
selecting at least one further program of broadcast content based on the determined user preference, obtaining the selected at least one further program of broadcast content, and recording the obtained at least one further program of broadcast content in a content recording medium;
automatically playing back and outputting at least part of the recorded at least one further program of broadcast content from the content recording medium selected based on a current user preference at a current time of day; and
automatically detecting at least one additional program of audio content whose program genre or program title is based on a current travel condition of the user and a physical travel environment feature associated with travel of the user which is other than and in accordance with a physical geography characteristic corresponding to a current position of travel of the user, and automatically selecting, obtaining and outputting the at least one additional program of audio content using one of obtaining the plurality of programs of broadcast content and obtaining the plurality of programs of stored content supplied from the predetermined recording medium.

2. The content providing apparatus according to claim 1, wherein said processing unit generates the user history by sequentially recording content data associated with each program of broadcast content obtained by said processing unit and associated with each program of stored content obtained by said processing unit.

3. The content providing apparatus according to claim 1, wherein said processing unit selects the at least one further program of broadcast content by searching for data representing a content profile obtained by said processing unit based on the user preference determined.

4. The content providing apparatus according to claim 1, wherein said processing unit automatically plays back and outputs the at least part of the recorded at least one further program of broadcast content having a genre or title that is determined to have a highest frequency of being obtained by the user at the current time of day.

5. The content providing apparatus according to claim 1, wherein said processing unit automatically plays back and outputs the at least part of the recorded at least one further program of broadcast content having a genre or title that is further determined based on one or more of current location of the user and current traveling speed of the user.

6. The content providing apparatus according to claim 1, wherein the genre or title that is based on the current travel condition of the user is automatically determined by the processing unit based on a current travel speed of the user.

7. The content providing apparatus according to claim 1, wherein the genre or title that is based on the current travel condition of the user is automatically determined by the processing unit based on a current location of the user.

8. The content providing apparatus according to claim 1, wherein the genre or title that is based on the current travel condition of the user is automatically determined by the processing unit based on a location type of a current location of the user.

9. A content providing method, comprising:
determining a preference of a user based on user selection for saving from among the programs of stored content and based on a user history of obtaining a plurality of programs of broadcast content and a plurality of programs of stored content, the user history including time of day of the obtaining of each program of broadcast content and time of day of the obtaining of each program of stored content so that the user preference varies as a function of time of day, the programs of broadcast content each including at least one of an audio signal or a video signal, the programs of stored content each including at least one of audio data or video data;

selecting at least one further program of broadcast content based on the determined user preference;

obtaining the selected at least one further program of broadcast content;

recording the obtained at least one further program of broadcast content in a content recording medium;

automatically playing back and outputting at least part of the recorded at least one further program of broadcast content from the content recording medium selected based on a current user preference at a current time of day;

automatically detecting at least one additional program of audio content whose program genre or program title is based on a current travel condition of the user and a physical travel environment feature associated with travel of the user which is other than and in accordance with a physical geography characteristic corresponding to a current position of travel of the user; and automatically selecting, obtaining and outputting the at least one additional program of audio content using one of the programs of broadcast content and the programs of stored content.

10. The content providing method according to claim 9, wherein said determining step includes generating the user history by sequentially recording content data associated with the obtained programs of broadcast content and associated with the obtained programs of stored content.

11. The content providing method according to claim 9, wherein recording step includes selecting the at least one further program of broadcast content by searching for data representing a content profile obtained based on the determined user preference.

12. The content providing method according to claim 9, wherein said at least part of the recorded at least one further program of broadcast content having a genre or title that is determined to have a highest frequency of being obtained by the user at the current time of day.

13. The content providing method according to claim 9, wherein said automatically playing back and outputting step automatically plays back and outputs the at least part of the recorded at least one further program of broadcast content having a genre or title that is further determined based on one or more of current location of the user and current traveling speed of the user.

14. The content providing method according to claim 9, wherein the genre or title that is based on the current travel condition of the user is automatically determined based on a current travel speed of the user.

15. The content providing method according to claim 9, wherein the genre or title that is based on the current travel condition of the user is automatically determined based on a current location of the user.

16. The content providing method according to claim 9, wherein the genre or title that is based on the current travel condition of the user is automatically determined based on a location type of a current location of the user.

* * * * *

UNITED STATES PATENT AND TRADEMARK OFFICE
CERTIFICATE OF CORRECTION

PATENT NO. : 8,613,022 B2  
APPLICATION NO. : 10/221634  
DATED : December 17, 2013  
INVENTOR(S) : Hiroaki Okajima et al.

Page 1 of 1

It is certified that error appears in the above-identified patent and that said Letters Patent is hereby corrected as shown below:

On the title page

Item (30), please insert --Foreign Applications: Japan 2001-19323 1/29/2001--.

Signed and Sealed this  
Twenty-fifth Day of February, 2014

Michelle K. Lee  
*Deputy Director of the United States Patent and Trademark Office*